(12) United States Patent
Komatsu et al.

(10) Patent No.: US 9,174,370 B2
(45) Date of Patent: Nov. 3, 2015

(54) FINE PAPER POWDER-CONTAINING RESIN MOLDED OBJECT AND MANUFACTURING METHOD THEREOF

(75) Inventors: Michio Komatsu, Iwaki (JP); Takamichi Matsushita, Tokyo (JP)

(73) Assignee: ECO RESEARCH INSTITUTE LTD., Tokyo (JP)

( * ) Notice: Subject to any disclaimer, the term of this patent is extended or adjusted under 35 U.S.C. 154(b) by 0 days.

(21) Appl. No.: 13/640,919

(22) PCT Filed: Dec. 27, 2011

(86) PCT No.: PCT/JP2011/080195
§ 371 (c)(1),
(2), (4) Date: Oct. 12, 2012

(87) PCT Pub. No.: WO2012/091003
PCT Pub. Date: Jul. 5, 2012

(65) Prior Publication Data
US 2013/0034675 A1    Feb. 7, 2013

(30) Foreign Application Priority Data

Dec. 28, 2010    (JP) .................. 2010-292352

(51) Int. Cl.
*B29C 45/00* (2006.01)
*B32B 5/14* (2006.01)
(Continued)

(52) U.S. Cl.
CPC ............ *B29C 45/0013* (2013.01); *B29C 44/04* (2013.01); *B29C 44/12* (2013.01);
(Continued)

(58) Field of Classification Search
USPC ................. 428/317.9, 316.6, 318.8
See application file for complete search history.

(56) References Cited

U.S. PATENT DOCUMENTS 5,660,900 A    8/1997    Andersen et al.
6,827,891 B2 *    12/2004    Hasegawa et al. ............ 264/45.3
(Continued)

FOREIGN PATENT DOCUMENTS

JP    08-073645    3/1996
JP    08-283484    10/1996
(Continued)

OTHER PUBLICATIONS

European Search Report dated Sep. 10, 2013, Application No. 11853052.6, 4 pages.
(Continued)

*Primary Examiner* — Hai Vo
(74) *Attorney, Agent, or Firm* — Rankin, Hill & Clark LLP

(57) ABSTRACT

Provided is a fine paper powder-containing resin molded object with a content of a thermoplastic resin being reduced to offer a lighter weight and a superior mechanical strength, and a manufacturing method thereof. The fine paper powder-containing resin molded object (1) is made from a thermoplastic resin containing fine paper powder and is composed of a non-foam layer (2) formed on the surface and a foam layer (3) formed in the inner side. The foam layer (3) has, in the order from the surface side, a first foam layer (3a) containing cells having an average cell diameter ranging from 10 to 100 μm, a second foam layer (3b) containing cells having an average cell diameter from 5 to 50 μm, and a third foam layer (3c) containing cells having an average cell diameter from 20 to 500 μm. The molded object (1) contains an aromatizing ingredient.

5 Claims, 3 Drawing Sheets

(51) Int. Cl.
- *B29C 44/04* (2006.01)
- *B29C 44/12* (2006.01)
- *B32B 5/32* (2006.01)
- *B32B 27/06* (2006.01)
- *B32B 27/18* (2006.01)
- *B29K 311/12* (2006.01)

(52) U.S. Cl.
CPC .. *B32B 5/14* (2013.01); *B32B 5/32* (2013.01); *B32B 27/065* (2013.01); *B32B 27/18* (2013.01); *B29K 2311/12* (2013.01); *B32B 2250/40* (2013.01); *B32B 2264/00* (2013.01); *B32B 2264/06* (2013.01); *Y10T 428/1372* (2015.01); *Y10T 428/24942* (2015.01); *Y10T 428/249981* (2015.04); *Y10T 428/249986* (2015.04); *Y10T 428/249989* (2015.04)

(56) References Cited

U.S. PATENT DOCUMENTS

| | | | |
|---|---|---|---|
| 8,361,612 B2 * | 1/2013 | Komatsu | 428/316.6 |
| 2009/0127731 A1 | 5/2009 | Kitamura | |
| 2012/0094109 A1 * | 4/2012 | Komatsu | 428/316.6 |

FOREIGN PATENT DOCUMENTS

| | | |
|---|---|---|
| JP | 2001-179903 | 7/2001 |
| JP | 2001-270958 | 10/2001 |
| JP | 2002-331542 | 11/2002 |
| JP | 2003-193586 | 7/2003 |
| JP | 2004-017285 | 1/2004 |
| JP | 2007-130826 | 5/2007 |
| JP | 2009-028523 | 2/2009 |
| JP | 4536161 | 6/2010 |
| WO | 00/73037 A1 | 12/2000 |
| WO | 2010/070857 | 6/2010 |
| WO | 2010/106592 | 9/2010 |
| WO | 2011/001791 | 1/2011 |

OTHER PUBLICATIONS

Japanese Office Action dated Mar. 3, 2015, 4 pages.

* cited by examiner

FINE PAPER POWDER-CONTAINING RESIN MOLDED OBJECT AND MANUFACTURING METHOD THEREOF

TECHNICAL FIELD

The present invention relates to a fine paper powder-containing resin molded object and a manufacturing method thereof.

BACKGROUND ART

In recent years, studies have been carried out on a fine paper powder-containing resin molded object which has fine paper powder finely pulverized from waste papers or the like being blended into a thermoplastic resin such as polyethylene, polypropylene or the like. For example, there has been known to produce chopsticks from an injection-molded article of polypropylene containing the fine paper powder (refer to Patent document 1).

Since the fine paper powder-containing resin molded object contains therein the fine paper powder, it is possible to reduce the content of the thermoplastic resin; moreover, if the fine paper powder equal to or greater than a predetermined amount is contained in the resin molded object, it is possible for it to be subjected to an incineration disposal as a general waste. However, as a content rate of the fine paper powder becomes higher, the fluidity of the thermoplastic resin in molten state becomes lower, which makes it difficult to perform injection molding due to certain manufacturing conditions such as the shape of a molded object or the like.

PRIOR ART DOCUMENTS

Patent Documents

Patent document 1: Japanese Patent Laid-open No. 2009-28523
Patent document 2: Japanese Patent Laid-open No. 2001-270958

SUMMARY OF INVENTION

Problem to be Solved by the Invention

In order to solve the above-mentioned problem, there has been considered to perform injection molding by including the fine paper powder into a thermoplastic resin composition such as polyethylene, polypropylene or the like in molten state while the thermoplastic resin composition is being impregnated under pressure with a fluid in supercritical state. According to this technique, the fluidity of the thermoplastic resin composition in molten state can be improved according to the impregnation of the fluid in supercritical state; thereby, even though the content rate of the fine paper powder in the thermoplastic resin is high, it is possible to perform injection molding regardless of the manufacturing conditions such as the shape of a molded object or the like.

After the thermoplastic resin impregnated with the fluid in supercritical state is injected into a cavity, as the pressure reduces to the critical pressure or less of the fluid, the fluid foams, which forms a foam layer composed of minute cells in the inner side of the obtained fine paper powder-containing resin molded object. Consequently, the obtained fine paper powder-containing resin molded object is formed with the foam layer in the inner side and a non-foam layer on the surface.

Therefore, after the thermoplastic resin composition in molten state is injected into the cavity, the capacity of the cavity is increased to reduce the pressure of the thermoplastic resin composition so as to actively foam the fluid; accordingly, it is considered that the obtained fine paper powder-containing resin molded object may be made further lighter.

However, if the capacity of the cavity is increased to reduce the pressure of the thermoplastic resin composition, a part of the cells contained in the foam layer of the fine paper powder-containing resin molded object will become very large, which makes it disadvantageous that a sufficient mechanical strength may not be obtained.

The present invention has been accomplished in view of the aforementioned problems, and it is therefore an object of the present invention to provide a fine paper powder-containing resin molded object with a content of a thermoplastic resin being reduced to offer a lighter weight and a superior mechanical strength, and a manufacturing method thereof.

Means for Solving the Problem

To attain an object described above, the present invention provides a fine paper powder-containing resin molded object which is made from a fine paper powder-containing thermoplastic resin and is composed of a non-foam layer formed on the surface and a foam layer formed in the inner side. The fine paper powder-containing resin molded object is configured to contain in the range of 1 to 400 parts by weight of the fine paper powder having an average particle diameter ranging from 25 to 200 μm with respect to 100 parts by weight of the thermoplastic resin, and the foam layer is composed of, in the order from the side closer to the surface, a first foam layer containing cells having an average cell diameter ranging from 10 to 100 μm, a second foam layer containing cells having an average cell diameter ranging from 5 to 50 μm, and a third foam layer containing cells having an average cell diameter ranging from 20 to 500 μm.

According to the fine paper powder-containing resin molded object of the present invention, it is possible to reduce the resin content of the thermoplastic resin if the fine paper powder having the average particle diameter within the above diameter range is contained in the weight range. Moreover, by forming the first to the third foam layers in the fine paper powder-containing resin molded object of the present invention, it is possible to make it lighter and meanwhile the cells are prevented from becoming very large to offer a superior mechanical strength.

If the fine paper powder contained is equal to or greater than a predetermined amount, the combustion calorie of the resin composition can be reduced, which makes it possible to be subjected to incineration disposal as a general waste.

It is not preferable to make the average particle diameter of the fine paper powder smaller than 25 μm since a special device would be needed to do so. On the other hand, it is also not preferable if the average particle diameter of the fine paper powder becomes greater than 200 μm since it would be difficult to blend the fine paper powder into the thermoplastic rein.

It is not preferable if the content of the fine paper powder is less than 1 part by weight with respect to 100 parts by weight of the thermoplastic resin in the fine paper powder-containing resin molded object of the present invention since the reducing effect of the resin content of the thermoplastic resin can not be achieved sufficiently. On the other hand, it is also not preferable if the content of the fine paper powder is more than 400 parts by weight with respect to 100 parts by weight of the thermoplastic resin it would be difficult to blend the fine paper powder into the thermoplastic rein.

In the fine paper powder-containing resin molded object of the present invention, the thermoplastic resin can be one kind of resin selected from a group of polyethylene, polypropylene, polyester, polylactate, thermoplastic elastomer, polystyrene, and ABS resin.

In the fine paper powder-containing resin molded object of the present invention, the fine paper powder can be finely pulverized from a raw material containing at least one kind of old paper selected from a group of newspapers, magazines, wrapping papers, corrugated fiberboards, and office automation papers.

Hitherto, the resin molded object made from the thermoplastic resin has been used in a piece of furniture, a frame body of an electrical product or the like; and as one having a function to offer aromatic smell, an aromatizing ingredient-containing resin molded object is known. According to the release of the aromatizing ingredient from the resin molded object, a user is expected to recognize the aromatizing ingredient as the aromatic smell.

As such resin molded object, there has been proposed one made from a foam body having continuous cells which enable the aromatizing ingredient to be exposed to the outer atmosphere (for example, refer to Patent document 2). In the resin molded object having the continuous cells, the aromatizing ingredient is exposed to the outer atmosphere through the continuous cells, it is released rather rapidly; thereby, the fragrance is unable to be lasted.

Thus, in order to provide a resin molded object having a superior long-lasting fragrance, it is preferable for the fine paper powder-containing resin molded object to contain an aromatizing ingredient according to the present invention.

According to the fine paper powder-containing resin molded object which contains the aromatizing ingredient, the aromatizing ingredient is stored in the cells of the foam layer. Specifically, the aromatizing ingredient stored in the first foam layer which is closer to the surface migrates to the outside via the non-foam layer to release the aromatizing ingredient. Moreover, the aromatizing ingredient stored in the third foam layer which is farther from the surface migrates to the first foam layer which is closer to the surface; thereby the release of the aromatizing ingredient is lasted.

Here, since the third foam layer is composed of cells having an average cell diameter from 20 to 500 µm which is greater than the first foam layer, it is possible to store the aromatizing ingredient in a high volume. Since the second foam layer between the third foam layer and the first foam layer is composed of cells having an average cell diameter from 5 to 50 µm which is smaller than the first foam layer, it is possible to restrain the migration of the aromatizing ingredient stored in the cells of the third foam layer to the first foam layer.

Thereby, according to the fine paper powder-containing resin molded object which contains the aromatizing ingredient of the present invention, it is possible to last the release of the aromatizing ingredient to the outside over a long time, which makes it possible to offer a superior long-lasting fragrance.

As the aromatizing ingredient contained in the fine paper powder-containing resin molded object of the present invention, for example, at least one kind selected from a group of hinokitiol, troponoid, α-thujapricin, γ-thujapricin, β-dolabrin, monoterpene hydrocarbons, monoterpene alcohols, phenols, phenol methyl ethers, sesquiterpene hydrocarbons, sesquiterpene alcohols, ketones, lactones, carboxylic acid, di-terpene alcohol, aldehyde, ester, oxide, ammonia, acetic acid, butyric acid, isovaleric acid, amino acid, organic acid, catechin, and fatty acid or the like can be used.

The fine paper powder-containing resin molded object of the present invention can be used as a molded object of one kind selected from a group of a floor covering material, a piece of furniture, a frame body of an electrical appliance, an automobile interior part, a cover of a bathtub, a toilet wall material, a kitchen member, a drinking vessel, various eating utensils other than the drinking vessel, a container, a package, a hollow body, a cold parison, a fishing lure, an insecticide container, a stationery product, and a file book.

It is preferable to form the fine paper powder-containing resin molded object of the present invention into a drinking vessel with at least an inner surface thereof being roughened by the fine paper powder. Since the inner surface of the drinking vessel made from the fine paper powder-containing resin molded object of the present invention has been roughened by the contained fine paper powder, the inner surface is made to have minute convexes and concaves. Thus, when carbonated drinks such as beers and the like are poured into the drinking vessel, minute air bubbles are generated on the inner surface of the drinking vessel to offer a creamy taste.

A manufacturing method of a fine paper powder-containing resin molded object of the present invention comprises steps of: forming a fine paper powder-containing thermoplastic resin composition by blending in the range of 1 to 400 parts by weight of the fine paper powder having an average particle diameter ranging from 25 to 200 µm with 100 parts by weight of a thermoplastic resin in molten state, impregnating the fine paper powder-containing thermoplastic resin composition under pressure with a fluid in supercritical state ranging from 0.05 to 2% by weight of the fine paper powder-containing thermoplastic resin composition, injecting the fine paper powder-containing thermoplastic resin composition impregnated with the fluid in supercritical state into a cavity having a predetermined shape, increasing a capacity of the cavity as a pressure of the fine paper powder-containing thermoplastic resin composition injected into the cavity is lower than a critical pressure of the fluid to reduce the pressure of the fine paper powder-containing thermoplastic resin composition at a first speed greater than a decreasing speed of the pressure accompanied with the decrement of a temperature of the fine paper powder-containing thermoplastic resin composition, further increasing the capacity of the cavity to reduce the pressure of the fine paper powder-containing thermoplastic resin composition at a second speed smaller than the first speed, and decreasing the capacity of the cavity before the temperature of the fine paper powder-containing thermoplastic resin composition becomes equal to or less than a temperature obtained by adding 70° C. to a glass transition temperature Tg of the thermoplastic resin ($L_T \leq Tg+70$) to increase the pressure of the fine paper powder-containing thermoplastic resin composition. According to the manufacturing method, it is possible to manufacture the fine paper powder-containing resin molded object of the present invention advantageously.

According to the manufacturing method of a fine paper powder-containing resin molded object of the present invention, firstly, the fine paper powder-containing thermoplastic resin composition is formed by blending in the range of 1 to 400 parts by weight of the fine paper powder having an average particle diameter ranging from 25 to 200 µm an with 100 parts by weight of the thermoplastic resin in molten state.

Next, the fine paper powder-containing thermoplastic resin composition is impregnated under pressure with a fluid in supercritical state ranging from 0.05 to 2% by weight of the fine paper powder-containing thermoplastic resin composition. If the impregnation amount of the fluid in supercritical state is less than 0.05% by weight of the fine paper powder-containing thermoplastic resin composition, it is not possible to offer the fine paper powder-containing thermoplastic resin composition with sufficient fluidity in the injection molding. However, if the impregnation amount of the fluid in supercritical state is greater than 2% by weight of the fine paper powder-containing thermoplastic resin composition, it is not possible to prevent large cells from being formed in the manufactured resin molded object.

Thereafter, the fine paper powder-containing thermoplastic resin composition impregnated with the fluid in supercritical state is injected into a cavity having a predetermined shape. Thereby, after the fine paper powder-containing thermoplastic resin composition in the cavity reaches the maximum pressure which is equal to or greater than the critical pressure of the fluid in supercritical state, the pressure decreases gradually as the temperature of the fine paper powder-containing thermoplastic resin composition decreases.

At the moment, the fluidity of the fine paper powder-containing thermoplastic resin composition is maintained when the temperature $L_T$ is higher than the temperature obtained by adding 70° C. to the glass transition temperature Tg of the thermoplastic resin ($L_T$>Tg+70). Thus, as the pressure becomes equal to or lower than the critical pressure of the fluid in supercritical state, the fluid foams to start the formation of cells, thereby, the first foam layer is formed.

Then, as the pressure of the fine paper powder-containing thermoplastic resin composition injected in the cavity becomes lower than the critical pressure of the fluid, the capacity of the cavity is increased to reduce the pressure of the fine paper powder-containing thermoplastic resin composition at a first speed greater than a decreasing speed of the pressure accompanied with the decrement of a temperature of the fine paper powder-containing thermoplastic resin composition. Accordingly, with the fluidity of the fine paper powder-containing thermoplastic resin composition being maintained in the first foam layer, cells with an average cell diameter smaller than the first foam layer are formed; thereby, the second foam layer having the cells is formed.

Subsequently, the capacity of the cavity is further increased to reduce the pressure of the fine paper powder-containing thermoplastic resin composition at a second speed smaller than the first speed. Here, it is acceptable that the second speed is smaller than the first speed; it is also acceptable that the second speed is greater or smaller than the decreasing speed of the pressure accompanied with the decrement of a temperature of the fine paper powder-containing thermoplastic resin composition. Accordingly, with the fluidity of the fine paper powder-containing thermoplastic resin composition being maintained, the cells in the third foam layer which is interior to the second foam layer grow up and forms cells having a greater average cell diameter than the first foam layer.

At this moment, a part of the cells having the average cell diameter greater than the first foam layer may become very large. Thus, before the temperature of the fine paper powder-containing thermoplastic resin composition becomes equal to or less than the temperature obtained by adding 70° C. to the glass transition temperature Tg of the fine paper powder-containing thermoplastic resin ($L_T$≤Tg+70), namely before the fine paper powder-containing thermoplastic resin composition loses its fluidity, the capacity of the cavity is decreased to increase the pressure of the fine paper powder-containing thermoplastic resin composition.

Thereby, the part of the cells having the average cell diameter greater than the first foam layer which became very large is pressurized to become minute to form the third foam layer which contains the cells having the average cell diameter greater than the first foam layer and is located inside the second foam layer. As the temperature $L_T$ of the fine paper powder-containing thermoplastic resin composition becomes equal to or lower than the temperature obtained by adding 70° C. to the glass transition temperature Tg of the thermoplastic resin ($L_T$≤Tg+70), the fine paper powder-containing thermoplastic resin composition solidifies substantially; thereby, even though the capacity of the cavity is decreased, it is not possible to miniaturize the very large cells.

Consequently, the fine paper powder-containing resin molded object having the above-mentioned structure can be obtained.

In the manufacturing method of the fine paper powder-containing resin molded object of the present invention, carbon dioxide or nitrogen may be used as the fluid in supercritical state.

It is preferable that the manufacturing method of the fine paper powder-containing resin molded object of the present invention includes a step of blending the aromatizing ingredient before the impregnation of the fluid in supercritical state with respect to the thermoplastic resin in the molten state. According to the manufacturing method of the fine paper powder-containing resin molded object of the present invention, by including a step of blending the aromatizing ingredient, it is possible to manufacture advantageously the fine paper powder-containing resin molded object of the present invention containing the aromatizing ingredient.

DESCRIPTION OF EMBODIMENTS

Hereinafter, an embodiment of the present invention will be described in detail with reference to the drawings.

Figure 1:
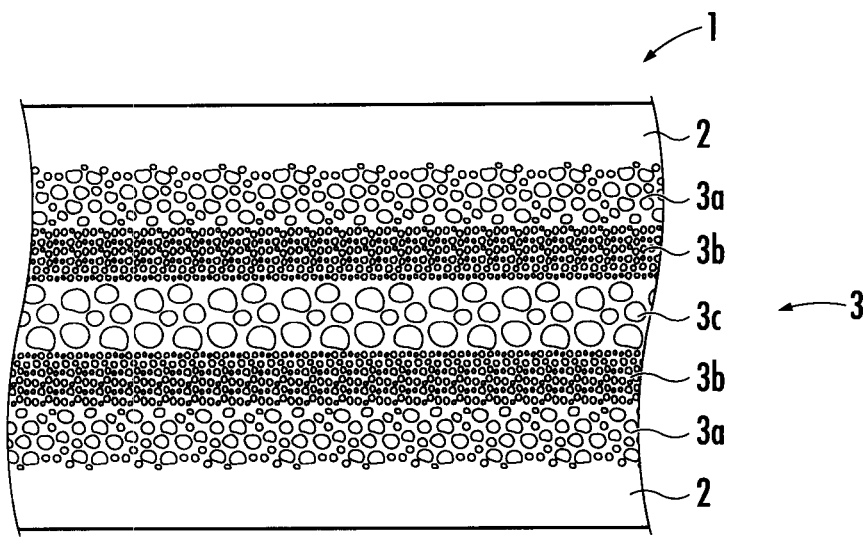
FIG. 1 is an explanatory cross sectional view illustrating a structure of a fine paper powder-containing resin molded object according to the present invention.

As illustrated in FIG. 1, a fine paper powder-containing resin molded object 1 of the present embodiment is made by a thermoplastic resin including fine paper powder and is composed of a non-foam layer 2 formed on the surface and a foam layer 3 formed in the inner side. The foam layer 3 is further composed of, in the order from the side closer to the surface, a first foam layer 3a, a second foam layer 3b containing cells having an average cell diameter smaller than the first foam layer, and a third foam layer 3c containing cells having the average cell diameter greater than the first foam layer.

The first foam layer 3a contains cells having the average cell diameter ranging from 10 to 100 μm, the second foam layer 3b contains cells having the average cell diameter ranging from 5 to 50 μm, and the third foam layer 3c contains cells having the average cell diameter ranging from 20 to 500 μm. For example, the average cell diameter of cells in the foam layer 3 can be obtained by observing the cross section of the fine paper powder-containing resin molded object 1 via an electron microscope to calculate the average value of the maximum diameter of each cell.

The thermoplastic resin constituting the fine paper powder-containing resin molded object 1 may be selected from any publicly known thermoplastic resin. For example, polyethylene, polypropylene, polyester, polylactate, thermoplastic elastomer, polystyrene, ABS resin or the like may be used.

Meanwhile, as the fine paper powder contained in the fine paper powder-containing resin molded object 1, any fine powder which is finely pulverized from a raw material containing various types of old papers such as newspapers, magazines, wrapping papers, corrugated fiberboards, and office automation papers and the like may be used. It is also acceptable to use any fine powder which is finely pulverized from a raw material containing broken and damaged sheets generated in manufacturing virgin paper, cutting wastage from magazines and books and the like, grinding powders, shredder scraps and the like as the fine paper powder. In order to be evenly blended in the thermoplastic resin in molten state, it is necessary that the average particle diameter of the fine paper powder is in a range from 25 to 200 μm, preferably from 30 to 75 μm.

Such fine paper powder may be obtained by firstly using a coarse crusher such as a roll crusher, a hammer crusher, a cutter mill or the like to pulverize the raw material, for example, various types of waste papers into coarse powder, subsequently using a first vertical type roller mill to finely pulverize the raw material into fine powder having an average particle diameter equal to or greater than 50 μm but less than 150 μm, and thereafter using a second vertical type roller mill to finely pulverize the raw material into fine powder having an average particle diameter equal to or greater than 25 μm but less than 50 μm.

Such manufacturing method of the fine paper powder has been described in detail, for example, in Japan Patent No. 4536161.

The fine paper powder-containing resin molded object 1 is configured to contain 1 to 400 parts by weight, preferably from 30 to 150 parts by weight of the fine paper powder having the average particle diameter within the above-mentioned range with respect to 100 parts by weight of the thermoplastic resin.

As a result, the fine paper powder-containing resin molded object 1 can be made to have a lighter weight by reducing the content of resin and meanwhile have a superior mechanical strength and a superior heat-insulating efficiency. If the fine paper powder contained is equal to or greater than a predetermined amount, the combustion calorie of the resin composition can be reduced, which makes it possible to be subjected to incineration disposal as a general waste.

According to the contents of the fine paper powder, the external appearance of the fine paper powder-containing resin molded object 1 can be varied from an appearance substantially similar to a common resin molded object to an appearance having a texture of a paper material. Therefore, the fine paper powder-containing resin molded object 1 can be used widely as, for example, a floor covering material, a piece of furniture, a frame body of an electrical appliance, an automobile interior part, a cover of a bathtub, a toilet wall material, a kitchen member, a drinking vessel, various eating utensils other than the drinking vessel, a container, a package, a hollow body, a cold parison, a fishing lure, an insecticide container, a stationery product, a file book or the like.

Particularly, it is possible to form the fine paper powder-containing resin molded object 1 into a drinking vessel with at least an inner surface thereof being roughened by the fine paper powder. The drinking vessel is shaped into a cup, a glass or the like, for example so as to be used as a container of carbonated drinks such as beers and the like. Since at least the inner surface of the drinking vessel has been roughened by the contained fine paper powder, the inner surface is made to have minute convexes and concaves. Thus, when the carbonated drinks such as beers and the like are poured into the drinking vessel made from the fine paper powder-containing resin molded object 1, minute air bubbles are generated on the inner surface of the drinking vessel to offer a creamy taste.

It is acceptable that at least the inner surface of the drinking vessel is roughened; however, it is also acceptable that the outer surface thereof is roughened, which thereby offers a soft tactile sensation in holding the drinking vessel.

Hereinafter, the manufacturing method of the fine paper powder-containing resin molded object 1 will be described.

Figure 2:
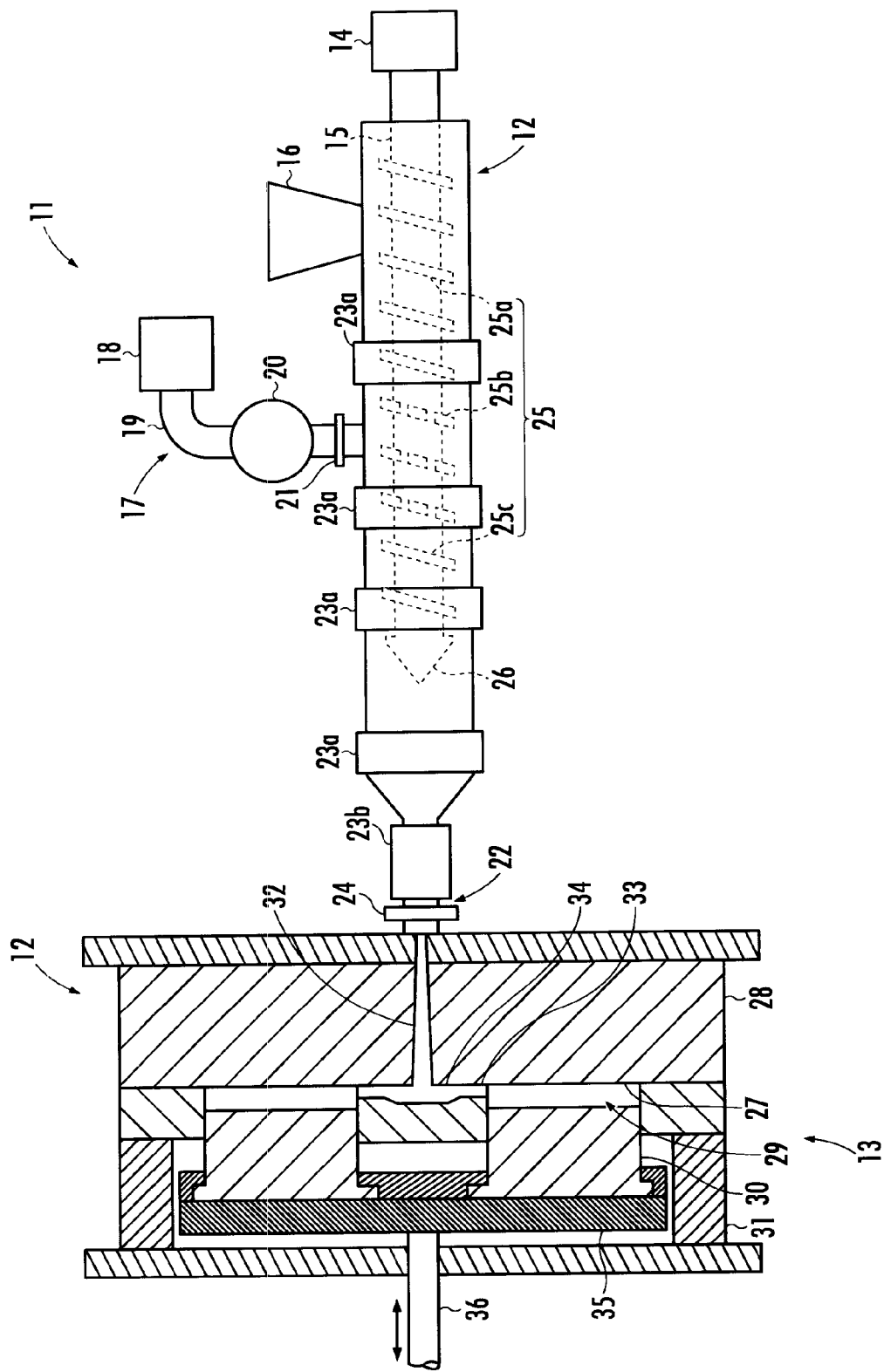
FIG. 2 is an explanatory cross sectional view illustrating an example of a configuration of an injection molding device used in manufacturing the fine paper powder-containing resin molded object according to the present invention.

The fine paper powder-containing resin molded object 1 can be manufactured by, for example, an injection molding apparatus 11 illustrated in FIG. 2.

The injection molding apparatus 11 is composed of a cylinder 12 and a mold 13 to which the thermoplastic resin is injected from the cylinder 12. The cylinder 12 is composed of a rotating shaft 15 which is disposed in the inner side thereof and is driven to rotate by a motor 14, a hopper 16 for supplying the thermoplastic resin and fine paper powder, and a supercritical fluid supply member 17 for supplying a fluid in supercritical state.

The hopper 16 is disposed at a position close to an end portion of the cylinder 12 opposite to the mold 13. The supercritical fluid supply member 17 is disposed at a position to the downstream side of the hopper 16 and close to a central portion of the cylinder 12. The supercritical fluid supply member 17 is composed of a supercritical fluid generating device 18 for generating the fluid in supercritical state, a fluid conducting pipe 19 for transferring the fluid in supercritical state generated at the supercritical fluid generating device 18, toward the cylinder 12, and a metering device 20 disposed in the midway of the fluid conducting pipe 19. The fluid conducting pipe 19 is connected to the cylinder 12 by the intermediary of a shut-off valve 21.

The cylinder 12 is provided with a nozzle 22 at a tip end to the side of the mold 13 and a plurality of heating devices 23a at the outer circumferential surface. The nozzle 22 is disposed with a heating device 23b at the outer circumferential surface thereof and is connected to the mold 13 by the intermediary of a shut-off valve 24.

The rotating shaft 15 is connected to the motor 14 at an end portion opposite to the mold 13 and is disposed with a helical screw 25 on the outer circumferential surface thereof and a screw head 26 at the tip end thereof at the side of the mold 13. The screw 25 is composed of a continuous basal screw 25a, a non-continuous screw 25b, and a continuous leading screw 25c.

The continuous basal screw 25a is disposed at a portion starting from an end portion at the side of the motor 14 through a lower portion of the hopper 16 and ending immediately before a lower portion of the supercritical fluid supply member 17. The non-continuous screw 25b is disposed at a portion below the supercritical fluid supply member 17, and is composed of a plurality of non-continuous members in the circumferential direction around the rotating shaft 15. The continuous leading screw 25c is disposed between the non-continuous screw 25b and the screw head 26.

The mold 13 is composed of a fixed die 28 which is disposed with a concave portion 27 having a shape fitting the exterior shape of the fine paper powder-containing resin molded object 1, and a movable die 31 which is disposed with a convex portion 30 to be fitted into the concave portion 27 to form a cavity 29. The fixed die 28 is provided with a sprue 32 in communication with the cylinder 12, and a runner 34 in communication with both the sprue 32 and the cavity 29 through a gate 33.

Meanwhile, the movable die 31 is provided with a supporting base 35 for supporting the convex portion 30, and a piston rod 36 for moving the supporting base 35 back and forth in the direction of the cavity 29. The piston rod 36 is connected to an external driving source such as a cylinder or the like (not shown).

In the injection molding device 11, as the convex portion 30 of the movable die 31 has been fitted into the concave portion 27 of the fixed die 28 to have the cavity 29 formed, the convex portion 30 can be drawn back and advanced forward in the direction of the cavity 29 by the piston rod 36 via the supporting base 35. Consequently, as the convex portion 30 is drawn back from the cavity 29, the capacity of the cavity 29 is increased (core back); as the convex portion 30 is advanced forward to the cavity 29, the capacity of the cavity 29 is decreased (core push).

In the injection molding device 11, firstly, the thermoplastic resin is fed into the cylinder 12 from the hopper 16. The thermoplastic resin is heated by the heating devices 23a while being agitated by the continuous screw 25a to melt into a molten resin in the cylinder 12.

Subsequently, the fine paper powder is fed into the cylinder 12 from the hopper 16. The feeding amount of the fine paper powder is, for example, in a range from 1 to 400 parts by weight, preferably from 30 to 150 parts by weight, with respect to 100 parts by weight of the thermoplastic resin. In addition, if the fine paper powder has been blended with the thermoplastic resin preliminarily into pellets, it is acceptable to feed the pellets into the cylinder 12 from the hopper 16. As such kind of the pellets, for example, MAPKA (Registered trademark) or PARPLAC (manufactured by Eco Research Institute Ltd.) may be used.

The fine paper powder is heated by the heating devices 23a while being agitated by the continuous screw 25a to be blended evenly with the molten resin in the cylinder 12 to form the fine paper powder-containing thermoplastic resin composition in molten state (hereinafter, abbreviated as the fine paper powder-containing molten resin). The fine paper powder-containing molten resin formed as aforementioned is transported in the direction toward the mold 13 by the continuous screw 25a.

Thereafter, the fluid in supercritical state ranging from 0.05 to 2% by weight of the fine paper powder-containing molten resin is supplied from the supercritical fluid supply member 17 to impregnate the fine paper powder-containing molten resin under pressure. As the fluid, carbon dioxide or nitrogen may be used.

The fluid in supercritical state is agitated by the non-continuous screw 25b disposed at a portion below the supercritical fluid supply member 17 to be blended and impregnated with the fine paper powder-containing molten resin sufficiently. Consequently, the fluid in supercritical state is impregnated with the fine paper powder-containing molten resin in the cylinder 12 between the screw head 26 and the nozzle 22. At the moment, the fine paper powder-containing molten resin is in a state without cores for forming foams being formed.

Next, the fine paper powder-containing molten resin impregnated with the fluid in supercritical state is injected from the nozzle 22 through the sprue 32, the runner 34, the gate 33 into the cavity 29. At the moment, the cavity 29 is defined to have a predetermined capacity by advancing the convex portion 30 for a predetermined distance.

Figure 3:
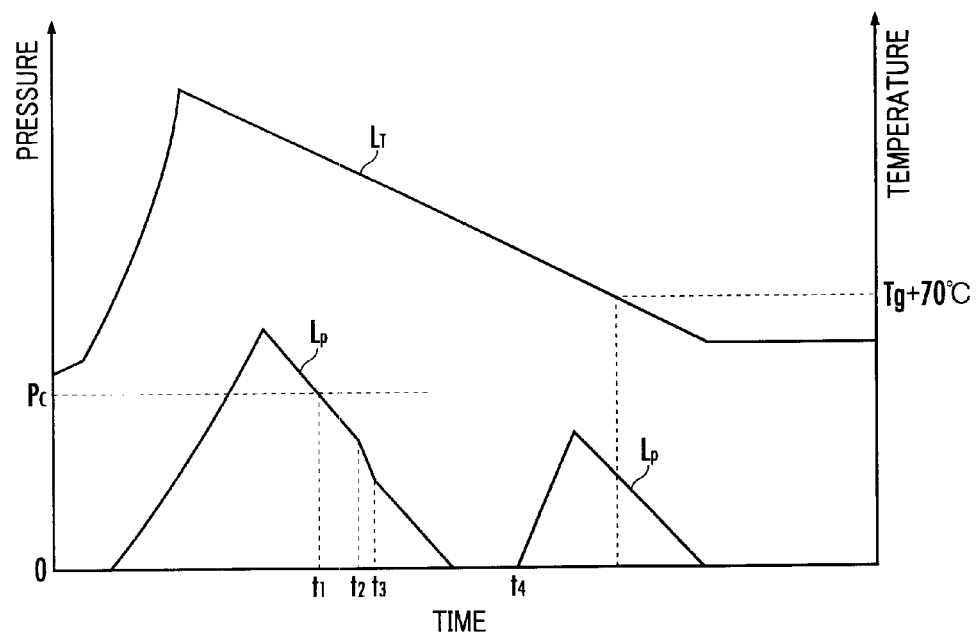
FIG. 3 is a graph illustrating a manufacturing method of the fine paper powder-containing resin molded object according to the present invention.

As illustrated in FIG. 3, the temperature $L_T$ of the fine paper powder-containing molten resin after being injected into the cavity 29, the temperature $L_T$ thereof increases until a predetermined time has elapsed and turns to decrease thereafter. The pressure $L_p$ of the fine paper powder-containing molten resin increases as a result of the increment of the temperature to once exceed the critical pressure Pc. However, after the temperature starts to decrease, the pressure $L_p$ of the fine paper powder-containing molten resin turns to decrease as well.

At the moment, the fluidity of the fine paper powder-containing molten resin is being maintained as the temperature $L_T$ is higher than the temperature obtained by adding 70° C. to the glass transition temperature Tg of the thermoplastic resin ($L_T$>Tg+70). Thus, as the pressure $L_p$ of the fine paper powder-containing molten resin becomes lower than the critical pressure Pc at the time $t_1$ of FIG. 3, the impregnated fluid turns from the supercritical state into the non-supercritical state and starts to foam, thereby, the first foam layer 3a is formed in the fine paper powder-containing molten resin with the fluidity thereof still being maintained. Moreover, in the portion of the fine paper powder-containing molten resin which contacts the inner wall of the cavity 29, the non-foam layer 2 is formed.

Then, during when the temperature $L_T$ is higher than the temperature obtained by adding 70° C. to the glass transition temperature Tg of the thermoplastic resin ($L_T$>Tg+70), after a predetermined time has elapsed from the time $t_1$, the convex portion 30 is drawn back from the cavity 29 at a predetermined distance by the piston rod 36 via the supporting base 35 at the time $t_2$. Consequently, the capacity of the cavity 29 is increased, which makes the pressure $L_p$ of the fine paper powder-containing molten resin to decrease at a first speed which is greater than the decreasing speed of the pressure $L_p$ accompanied with the decrement of the temperature $L_T$ of the fine paper powder-containing molten resin.

The first speed ranges, for example, from 50 to 100 MPa/s. According thereto, in the fine paper powder-containing molten resin with the fluidity thereof still being maintained, the second foam layer 3b containing cells having the average cell diameter smaller than the first foam layer 3a is formed interior to the first foam layer 3a.

Thereafter, during when the temperature $L_T$ is higher than the temperature obtained by adding 70° C. to the glass transition temperature Tg of the thermoplastic resin ($L_T$>Tg+70), after the operation for decreasing the pressure $L_p$ of the fine paper powder-containing molten resin has been conducted at the first speed for a predetermined time, the convex portion 30 is further drawn back from the cavity 29 at a predetermined distance by the piston rod 36 via the supporting base 35 at the time $t_3$. Consequently, is the capacity of the cavity 29 is further increased, which thereby makes the pressure $L_p$ of the fine paper powder-containing molten resin to decrease at a second speed.

The second speed is smaller than the first speed and ranges, for example, from 5 to 30 MPa/s. According thereto, in the fine paper powder-containing molten resin with the fluidity thereof still being maintained, a layer containing cells having the average cell diameter greater than the first foam layer 3a is formed interior to the second foam layer 3b.

However, if the fine paper powder-containing molten resin is solidified after the operation for decreasing the pressure $L_p$ of the fine paper powder-containing molten resin has been conducted at the second speed, the cells in the layer interior to the second foam layer 3b become very large accompanied with the decrement of the temperature $L_T$ of the fine paper powder-containing molten resin. Thereby, there is a danger that the strength of the fine paper powder-containing resin molded object 1 may be deteriorated due to the containing of the very large cells.

Thereafter, the temperature $L_T$ of the fine paper powder-containing molten resin becomes equal to or lower than the temperature obtained by adding 70° C. to the glass transition temperature Tg of the thermoplastic resin ($L_T$Tg+70), the convex portion 30 is advanced forward with respect to the cavity 29 at a predetermined distance by the piston rod 36 via the supporting base 35 at the time $t_4$ prior to the solidification of the fine paper powder-containing molten resin. Consequently, the capacity of the cavity 29 is decreased, which thereby makes the pressure $L_p$ of the fine paper powder-containing molten resin to increase.

Thereby, in the fine paper powder-containing molten resin with the fluidity thereof still being maintained, the very large cells interior to the second foam layer 3b are pressurized to become minute to form the third foam layer 3c which is removed with the very large cells and contains the cells having the average cell diameter greater than the first foam layer 3a.

Thereafter, the temperature $L_T$ and the pressure $L_p$ of the fine paper powder-containing molten resin are made to decrease naturally to have the fine paper powder-containing molten resin solidify, thereby, the fine paper powder-containing resin molded object 1 having the structure illustrated in FIG. 1 is obtained.

It is acceptable that the fine paper powder-containing resin molded object 1 of the present embodiment further contains an aromatizing ingredient. It is possible to blend a publicly known aromatizing ingredient into the thermoplastic resin so as to contain therein the aromatizing ingredient. As the publicly known aromatizing ingredient, for example, hinokitiol, troponoid, α-thujapricin, γ-thujapricin, β-dolabrin, monoterpene hydrocarbons, monoterpene alcohols, phenols, phenol methyl ethers, sesquiterpene hydrocarbons, sesquiterpene alcohols, ketones, lactones, carboxylic acid, di-terpene alcohol, aldehyde, ester, oxide, ammonia, acetic acid, butyric acid, isovaleric acid, amino acid, organic acid, catechin, and fatty acid or the like may be given. The aromatizing ingredient contained in the fine paper powder-containing resin molded object 1 may be one aromatizing ingredient or a plurality of aromatizing ingredients selected from the group.

According to the fine paper powder-containing resin molded object 1 which contains the aromatizing ingredient of the present embodiment, the contained aromatizing ingredient is stored in the cells of the foam layer 3. Specifically, the aromatizing ingredient stored in the first foam layer 3a which is closer to the surface migrates to the outside via the non-foam layer 2 to release the aromatizing ingredient. Moreover, the aromatizing ingredient stored in the third foam layer 3c which is farther from the surface migrates to the first foam layer 3a which is closer to the surface; thereby the release of the aromatizing ingredient is lasted.

Here, since the third foam layer 3c is composed of the cells having the average cell diameter greater than the first foam layer 3a, it is possible to store the aromatizing ingredient in a high volume in the cells. Since the second foam layer 3b between the third foam layer 3c and the first foam layer 3a is composed of the cells having the average cell diameter smaller than the first foam layer 3a, it is possible to restrain the migration of the aromatizing ingredient stored in the cells of the third foam layer 3c to the first foam layer 3a.

Thereby, according to the fine paper powder-containing resin molded object 1 which contains the aromatizing ingredient of the present embodiment, it is possible to last the release of the aromatizing ingredient to the outside over a long time, in other words, it is possible to offer a superior long-lasting fragrance.

In the manufacturing method of the fine paper powder-containing resin molded object 1, after the fine paper powder is fed into the cylinder 12 from the hopper 16, it is possible to feed the aromatizing ingredient into the cylinder 12 from the hopper 16 prior to the supply of the fluid in supercritical state or at the same time as the feeding of the fine paper powder so as to manufacture the fine paper powder-containing resin molded object 1 which contains the aromatizing ingredient of the present embodiment. The feeding amount of the aromatizing ingredient may ranges for example from 0.1 to 5 parts by weight with respect to 100 parts by weight of the thermoplastic resin. In addition, it is acceptable that the fine paper powder and the aromatizing ingredient are preliminarily blended with the thermoplastic resin and prepared into pellets, and thereafter the pellets are fed into the cylinder 12 from the hopper 16.

The present embodiment has been described by blending the fine paper powder in the molten resin; however, it is acceptable that a part of the fine paper powder is replaced by wood powder and the mixture of the fine powder and the wood powder is blended in the molten resin.

DESCRIPTION OF REFERENCE NUMERALS

1: fine paper powder-containing resin molded object; 2: non-foam layer; 3a: first foam layer; 3b: second foam layer; 3c: third foam layer; 11: injection molding device; 29: cavity

The invention claimed is:

1. A fine paper powder-containing resin molded object made from a thermoplastic resin containing fine paper powder, comprising a non-foam layer formed on a surface and a foam layer formed in an inner side,
   wherein the fine paper powder-containing resin molded object contains 1 to 400 parts by weight of the fine paper powder finely pulverized from a raw material containing at least one of old paper selected from the group consisting of newspapers, magazines, wrapping papers, corrugated fiberboards, and office automation papers and having an average particle diameter ranging from 25 to 200 µm with respect to 100 parts by weight of the thermoplastic resin, the thermoplastic resin being at least one selected from the group consisting of polyethylene, polypropylene, polyester, polylactate, thermoplastic elastomer, polystyrene, and ABS resin,
   the foam layer is composed of, in the order from a side closer to the surface, a first foam layer containing cells having an average cell diameter ranging from 10 to 100 µm, a second foam layer containing cells having an average cell diameter which is smaller than the average cell diameter of the first foam layer and which ranges from 5 to 50 µm, and a third foam layer containing cells having an average cell diameter which is larger than the average cell diameter of the first foam layer and which ranges from 20 to 500 µm, and
   wherein the fine paper powder-containing resin molded object is free of wood powder.

2. The fine paper powder-containing resin molded object according to claim 1, wherein the fine paper powder-containing resin molded object contains an aromatizing ingredient.

3. The fine paper powder-containing resin molded object according to claim 2, wherein the aromatizing ingredient contains at least one of compound selected from a group of hinokitiol, troponoid, α-thujapricin, γ-thujapricin, β-dolabrin, monoterpene hydrocarbons, monoterpene alcohols, phenols, phenol methyl ethers, sesquiterpene hydrocarbons, sesquiterpene alcohols, ketones, lactones, carboxylic acid, di-terpene alcohol, aldehyde, ester, oxide, ammonia, acetic acid, butyric acid, isovaleric acid, amino acid, organic acid, catechin, and fatty acid.

4. The fine paper powder-containing resin molded object according to claim 1, wherein the fine paper powder-containing resin molded object comprises a molded object of one selected from a group of a floor covering material, a piece of furniture, a frame body of an electrical appliance, an automobile interior part, a cover of a bathtub, a toilet wall material, a kitchen member, a drinking vessel, various eating utensils other than the drinking vessel, a container, a package, a hollow body, a cold parison, a fishing lure, an insecticide container, a stationery product, and a file book.

5. The fine paper powder-containing resin molded object according to claim 1, wherein the fine paper powder-containing resin molded object comprises a drinking vessel with at least an inner surface thereof being roughened by the fine paper powder.

* * * * *